(No Model.)

W. H. HEFNER.
GATE.

No. 559,799. Patented May 12, 1896.

Witnesses:
C. H. Rauder
N. F. Matthews

Inventor
W. H. Hefner
By James J. Sheehy
Attorney

UNITED STATES PATENT OFFICE.

WILLIAM H. HEFNER, OF ROCK HILL, SOUTH CAROLINA.

GATE.

SPECIFICATION forming part of Letters Patent No. 559,799, dated May 12, 1896.

Application filed October 21, 1895. Serial No. 566,378. (No model.)

*To all whom it may concern:*

Be it known that I, WILLIAM H. HEFNER, a citizen of the United States, residing at Rock Hill, in the county of York and State of South Carolina, have invented certain new and useful Improvements in Gates; and I do declare the following to be a full, clear, and exact description of the invention, such as will enable others skilled in the art to which it appertains to make and use the same.

This invention relates to improvements in gates; and it has for its object to facilitate the opening and closing, the closing movement being automatic, while in the opening movement the gate rises, so as to clear itself from dirt, snow, ice, and other obstructions which may be on the ground beneath it.

The invention and its many advantages will appear from the following description and claim, when taken in connection with the annexed drawings, in which—

Figure 1:
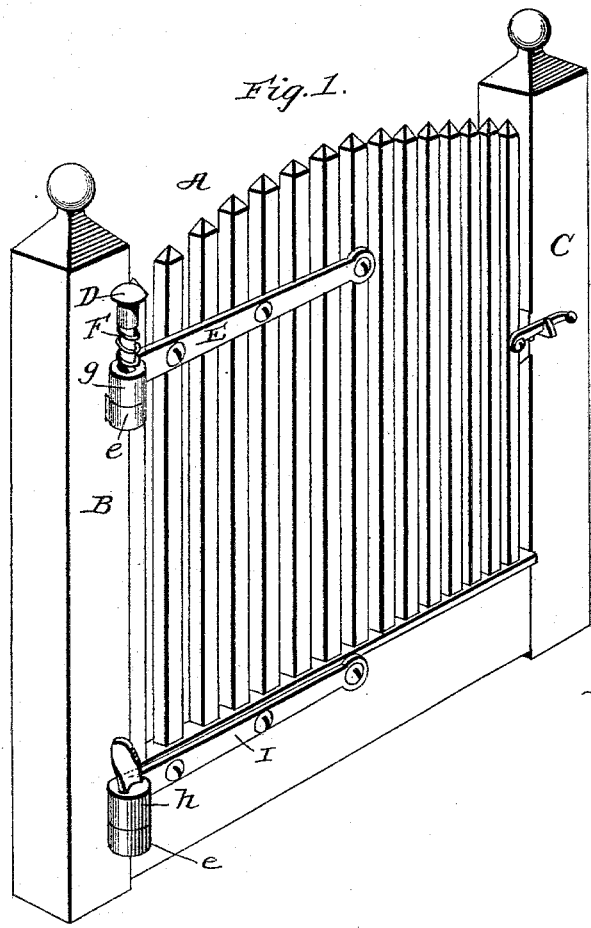
Figure 2:
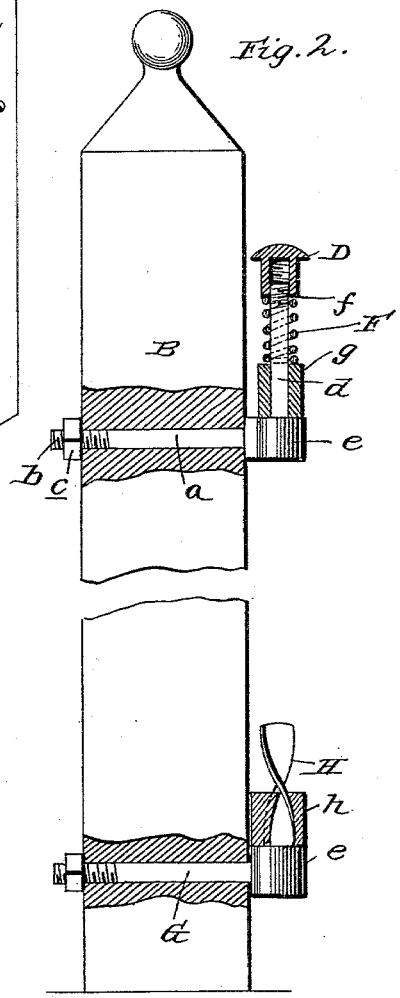

Figure 1 is a perspective view of a gate with my improvements applied; and Fig. 2 is a view, partly in section and partly in elevation, of the hinge-post with my improvements in position.

Referring by letter to said drawings, A indicates a gate, B the hinge-post, and C the latch-post. These parts constitute no portion of my invention, and they may be of any ordinary or approved construction, being here shown simply for the purpose of illustrating my improvements.

The gate is connected with the post B by two hinges, the upper hinge comprising a section having a bolt $a$, which takes through a suitable aperture in the post B, and is threaded at its inner or free end, as shown at $b$, to receive a nut $c$ or the like, for securing it to said post. The opposite end of this section is provided with a pintle $d$, which rises from a head or shoulder $e$, and is screw-threaded at its upper end, as shown at $f$, to receive a tension-nut D. The strap or section E of the upper hinge, which is secured to the gate, has the usual vertically-disposed eye $g$ to receive the pintle $d$. The pintle is sufficiently long to allow the eye portion of the section E to play vertically thereon, and a spiral or other suitable spring F is placed upon the pintle between the section E and the nut D. This nut is preferably a cap-nut, as better shown at Fig. 2 of the drawings, and its screw-tapped aperture is sufficiently deep to permit it being turned down upon the spring F, so that should the latter become loose in use it may be materially strengthened by the manipulation of the nut. The lower hinge comprises a section which is mainly of the same construction as the corresponding section of the upper hinge, and is secured to the hinge-post in a similar manner. From the outer end of the lower section G rises a bar or arm H. This arm, which is approximately flat, is twisted transversely, as better shown in Fig. 2 of the drawings, and the sharpness of the twist depends upon the extent of vertical movement it is desired to give the gate in opening. The section G has a stop or shoulder $e$ at the base of the twisted arm H. This arm serves as a pintle for the lower hinge in addition to giving the rising and falling movement to the gate in opening and closing. The strap or section I of the lower hinge, instead of having a circular eye, has an eye $h$ of a configuration corresponding in cross-section to the twisted pintle or arm H.

By the construction described it will be seen that as the gate starts in its opening movement it will ride up on the pintles by reason of the lower pintle being twisted, and when the operator lets go of the gate, the spring $f$ acting to force it down upon the pintle, the twisted one thereof will move the gate to a close, and the force which it is designed to employ in closing the gate may be regulated according to the force and tension of the spring employed.

Having described my invention, what I claim is—

The combination with a hinge-post and a gate; of the lower hinge having one section provided with a flat twisted pintle, and the other section having an eye corresponding in cross-section to a cross-section of the pintle, the upper hinge having one section provided with a pintle threaded at its upper end and the other section having a circular eye to receive the same, a cap-nut on the threaded end of the pintle, and the spring interposed between the cap-nut and the adjacent section of the hinge and surrounding the pintle, substantially as specified.

In testimony whereof I affix my signature in presence of two witnesses.

WILLIAM H. HEFNER.

Witnesses:
   JAS. R. BOULWARE,
   PAUL WORKMAN.